(12) United States Patent
Yi et al.

(10) Patent No.: US 7,348,685 B2
(45) Date of Patent: Mar. 25, 2008

(54) METHOD AND APPARATUS FOR SUPPLYING FRESH WATER AND GENERATING ELECTRICITY BY COLLECTED RAINWATER

(75) Inventors: Jwo-Hwu Yi, Tainan (TW); Yu-Chien Cho, Tanyuan (TW); Chien-Ting Lin, Taipei (TW)

(73) Assignee: Kun Shan University, Yung-Kung (TW)

( * ) Notice: Subject to any disclaimer, the term of this patent is extended or adjusted under 35 U.S.C. 154(b) by 84 days.

(21) Appl. No.: 11/307,566

(22) Filed: Feb. 13, 2006

(65) Prior Publication Data

US 2007/0057518 A1    Mar. 15, 2007

(30) Foreign Application Priority Data

Sep. 14, 2005    (TW) .............................. 94131937 A

(51) Int. Cl.
*F03B 17/02*    (2006.01)
*F03B 3/10*    (2006.01)

(52) U.S. Cl. .......................... 290/43; 290/54; 415/202

(58) Field of Classification Search ................. 290/43, 290/44, 53, 54, 55; 415/202, 116; 416/197 A; 60/398, 325

See application file for complete search history.

(56) References Cited

U.S. PATENT DOCUMENTS 1,108,700 A * 8/1914 Christoffel .............. 416/197 R
4,092,827 A * 6/1978 Schneider .................... 60/398
4,246,753 A * 1/1981 Redmond .................... 60/398
4,352,025 A * 9/1982 Troyen ........................ 290/54
4,433,248 A * 2/1984 Marks .......................... 290/44
4,443,707 A * 4/1984 Scieri et al. ................ 290/4 R
5,157,922 A * 10/1992 Baruch ......................... 60/325
5,389,821 A * 2/1995 Moulliet ..................... 290/1 R
7,233,078 B2 * 6/2007 Baarman et al. ............. 290/43

* cited by examiner

*Primary Examiner*—Nicholas Ponomarenko
(74) *Attorney, Agent, or Firm*—Alan Kamrath; Kamrath & Associates PA

(57) ABSTRACT

A method and apparatus includes supplying fresh water and generating electricity from collected rainwater. The method includes providing hollow buoyant members under the reservoir as support. The method also includes providing steel ropes, driving piles into the ground and securing the piles to the steel ropes. The method also includes forming gates, building hydroelectric generators, building a waterworks, and providing tubes connected from the gates to the waterworks through the hydroelectric generators. Rainwater collected and stored in the reservoir is transferred to the hydroelectric generators. Further, the waterworks is adapted to receive water from the hydroelectric generators. Moreover, sprinklers, drive devices, and oblique plates for directing rainwater and decreasing evaporation may be provided.

16 Claims, 1 Drawing Sheet

METHOD AND APPARATUS FOR SUPPLYING FRESH WATER AND GENERATING ELECTRICITY BY COLLECTED RAINWATER

BACKGROUND OF THE INVENTION

1. Field of Invention

The present application relates to a method for supplying fresh water and generating electric power by water collected in the reservoirs in the air and the reservoirs on the water.

2. Related Art

Conventionally, a dam is built in an upstream or midstream section of a river to hold back flowing water to form a reservoir. Water collected and stored in the reservoir can be utilized to supply fresh water or generate electricity. However, reservoirs have a number of drawbacks. For example, people living downstream of the reservoir may be exposed to danger. Further, water collection efficiency may be low if rain does not fall in the water collection areas. Furthermore, it may adversely affect ecology of a river. In additions a reservoir has an elevation drop of no more than several tens of meters. Thus, it is desirable to provide a novel method of collecting water and generating electricity in order to overcome the inadequacies of the prior art and contribute significantly to the advancement of the art.

SUMMARY OF THE INVENTION

It is therefore an object of the present invention to provide a method of collecting water and generating electricity comprising the steps of:

forming one or more reservoirs for collecting rainwater;
providing one or more hollow buoyant members under each reservoir for supporting said reservoirs floated in the air or on the water;
providing a plurality of steel ropes each having one end secured to the reservoir for traction;
providing a plurality of piles each driven into the ground and secured to the other end of the steel rope for fixing the reservoir and buoyant members;
forming one or more gates for controlling water yield therein;
providing one or more tubes each having one end in fluid communication with each reservoir through the gate for guiding flows of water;
building one or more hydroelectric generators in intermediate portions of the tubes for electricity generation; and
wherein rain collected and stored in each reservoir is adapted to transfer to the hydroelectric generators through the gates and the tubes for generating electricity.

In one aspect of the present invention the method further comprises providing one or more sprinklers each between two adjacent buoyant members, the sprinklers being adapted to downwardly spray a portion of stored water in each reservoir in the air or on the water; providing one or more drive devices on each reservoir in the air or on the water, the drive devices being adapted to move each reservoir in the air or on the water; and providing one or more oblique plates on each reservoir in the air or on the water for directing rain into each reservoir in the air or on the water and decreasing evaporation of water stored in each reservoir in the air or on the water.

In a further aspect of the present invention the method further comprises providing one or more pumps each adapted to transfer water to a conventional reservoir or the waterworks if water stored in each reservoir on the water is less than a predetermined quantity.

The above and other objects, features and advantages of the present invention will become apparent from the following detailed description taken with the accompanying drawings.

DETAILED DESCRIPTION OF THE INVENTION

Figure 1:
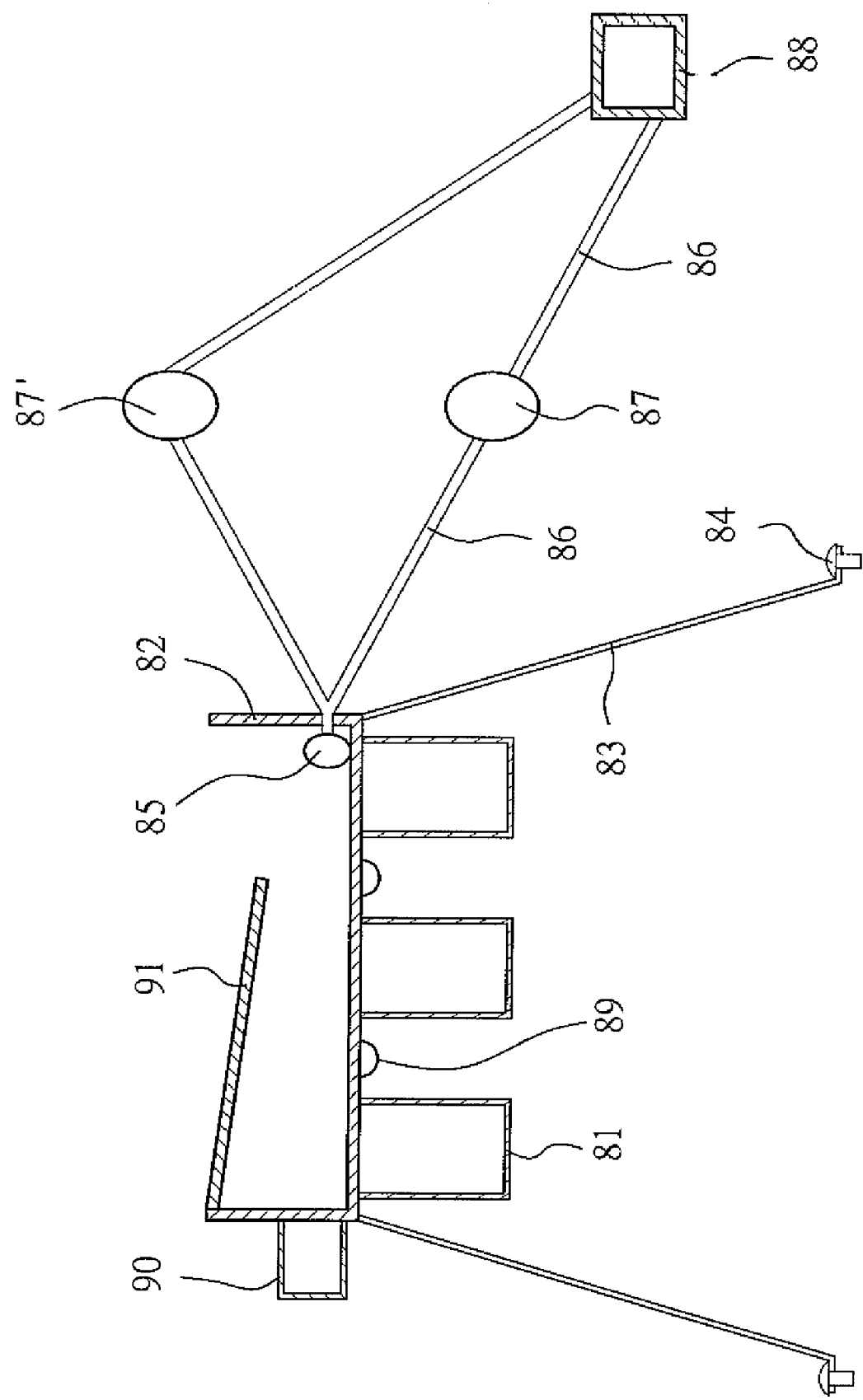
FIG. 1 schematically depicts a system of collecting water and generating electricity by a reservoir in the air according to the invention.

One type of low clouds is nimbostratus having an elevation of about 600 meters. Another type of clouds is cumulonimbus as a source of heavy rain having an elevation of about 1,200 meters. Thus, it is envisioned by the invention to fully utilize such elevation drop of several hundreds meters rather than elevation drop of several tens meters of a conventional reservoir.

Referring to FIG. 1, a system of collecting water and generating electricity by a reservoir in the air in accordance with a preferred embodiment of the invention is shown. The system comprises a reservoir 82 formed of materials having properties of low density, high strength, and being corrosion resistant such as FRP (fiberglass reinforced plastics), one or more hollow buoyant members 81 filled with gas having a density less than air (e.g., helium) and formed under the reservoir 82 for supporting the reservoir 82 floated in the air, and a plurality of steel ropes 83 each having one end fastened at bottom of the reservoir 82. The reservoir 82 and buoyant members 81 are secured to a plurality of piles 84 driven into the ground, through the plurality of steel ropes 83 so as to prevent the reservoir 82 from being blown away by strong wind. The reservoir 82 is provided with one or more gates 85 and tubes 86. The tubes 86 each have one end in fluid communication with water stored in the reservoir 82 through the gate 85. One or more hydroelectric generators 87 are built on the ground for collecting water from intermediate portions of the tubes 86 and a conventional reservoir or waterworks 88 is built on the ground for collecting water from the other ends of the tubes 86.

One or more of the sprinklers 89 may be provided between two adjacent buoyant members 81 and adapted to spray water (i.e., as rain) on plants grown under the reservoir 82 and soil thereunder so as to reduce any potential ecology damage of that area to a minimum.

One or more drive devices 90 may be provided on sides of the reservoir 82 and adapted to move the reservoir 82 to a desired area for collecting water if such need arises.

The reservoir 82 may be provided with one or more oblique plates 91 for directing rain to flow into the reservoir 82 through gaps between the oblique plate 91 and a top of the reservoir 82. The oblique plate 91 also has the effect of decreasing evaporation of water stored in the reservoir 82.

The hydroelectric generator 87 is adapted to generate more electricity as compared with a conventional hydroelectric power station since the elevation drop of several hundreds meters (i.e., a vertical distance from bottom of the reservoir 82 to the hydroelectric generator 87 is several hundreds meters) is utilized by the hydroelectric generator 87. The conventional reservoir or waterworks 88 is adapted to bring a water supply to a city, factories, or farmland.

Preferably, the reservoir 82 is constructed above a watershed. For example, a conventional reservoir is constructed at one side (i.e., water collecting area) of a ridge. That is, the other side of the ridge is not a water collecting area. In a case of lack of rain (i.e., the reservoir has a small quantity of stored water), it is possible to activate the drive device 90 to move the reservoir 82 to the air over the other side of the ridge so as to collect water. Water collected by the reservoir 82 is then directed to the conventional reservoir through the tubes 86. As a result, more water is collected by the reservoir by dynamically increasing water collecting areas thereof. In another case of the reservoir having a large quantity of stored water, it is possible of activating to activate the drive device 90 to move the reservoir 82 to the air over one side of the ridge so as to collect water. Water collected by the reservoir 82 is then directed to the non-water collecting area through the tubes 86. As a result, less water is collected by the reservoir by dynamically decreasing water collecting areas.

It is understood that a large quantity of rain falls on the sea rather than on the land. That is, typically less water is collected for use. It is thus envisioned by the invention to fully utilize rain falling on the sea or the like. Rain is collected and stored by a novel floating reservoir on the water. Water stored in the reservoir on the water can be utilized to generate electricity if its quantity is sufficient. Also, water can be further utilized to bring a water supply to a city, factories, or farmland.

Referring to FIG. 1 again, a system of collecting water and generating electricity by a reservoir on the water in accordance with another preferred embodiment of the invention is shown. The system is built on the sea in this embodiment. However, the system can be also be built on a lake or a conventional reservoir in other embodiments. The system comprises a reservoir 82 on the water formed of FRP having properties of low density, high strength, and being corrosion resistant, one or more hollow buoyant members 81 filled with materials having a density less than water (e.g., cork) and formed under the reservoir 82 for supporting the reservoir 82 on the water, and a plurality of steel ropes 83 each having one end fastened at bottom of the reservoir 82. The reservoir 82 and buoyant members 81 are secured to a plurality of piles 84 driven into the sea bed, through the plurality of steel ropes 83 so as to prevent the reservoir 82 from drifting away by wave action. The reservoir 82 is provided with one or more gates 85 and tubes 86. The tubes 86 each have one end in fluid communication with water stored in the reservoir 82 through the gate 85. One or more hydroelectric generators 87 is built on the intermediate portions of the tubes 86, and a conventional reservoir or a waterworks 88 is built on the ground for collecting water from the other ends of the tubes 86. Note that at least one pump 87' may be additionally installed in the position of the gates 85 in order to transfer water to the conventional reservoir or the waterworks 88 if only a small quantity of water is stored in the reservoir 82.

One or more sprinklers 89 may be provided between two adjacent buoyant members 81 and adapted to spray water (i.e., as rain) on an area under the reservoir 82 so as to lower any potential ecology damage of that area to a minimum.

One or more drive devices 90 may be provided on sides of the reservoir 82 and adapted to move the reservoir 82 to a desired area for collecting water if such need arises.

The reservoir 82 may be provided with one or more oblique plates 91 for directing rain to flow into the reservoir 82 through gaps between the oblique plate 91 and a top of the reservoir 82. The oblique plate 91 also has the effect of decreasing evaporation of water stored in the reservoir 82. Moreover, the oblique plate 91 can be implemented as a solar collector for additionally generating electricity. The conventional reservoir or waterworks 88 is adapted to bring a water supply to a city, factories, or farmland. The reservoir 82 thus has the following advantages including no land occupation, no potential ecology damage, and serving as a solar power station, artificial reef, or breakwater.

For example, the reservoir on the water is built on a conventional reservoir or on the sea. Water collected and stored in the reservoir on the water is relatively clean with low turbidity. Thus, there is no worry about water with high turbidity being supplied, as experienced in a conventional reservoir when heavy rain falls on the water collecting areas.

In another example of lacking rain (i.e., the conventional reservoir has a small quantity of stored water), it is possible to activate the drive device 90 to move the reservoir 82 on the water to a specific sea area with heavy rainfall so as to collect water. Water collected by the reservoir 82 is then directed to the conventional reservoir or waterworks 88 through the tubes 86. As a result, more water is collected by the conventional reservoir by dynamically increasing water collecting areas, While the invention herein disclosed has been described by means of specific embodiments, numerous modifications and variations could be made thereto by those skilled in the art without departing from the scope and spirit of the invention set forth in the claims.

What is claimed is:

1. A method of collecting rainwater and generating electricity comprising:

forming at least one reservoir for collecting rainwater;

providing at least one hollow buoyant member under the at least one reservoir for supporting said at least one reservoir;

providing a plurality of steel ropes each having one end secured to the at least one reservoir for traction and an other end opposite the one end;

providing a plurality of piles each driven into ground and secured to the other end of a corresponding one of the plurality of steel ropes fixing the at least one reservoir and the at least one hollow buoyant member;

forming at least one gate controlling water yield;

providing at least one tube having a fluid end in fluid communication with the at least one reservoir through the at least one gate guiding flows of water, with the tube having an intermediate portion spaced from the fluid end;

building at least one hydroelectric generator in the intermediate portion of the at least one tube, with the hydroelectric generator generating electricity; and wherein the rainwater collected and stored in the at least one reservoir flows to the at least one hydroelectric generator through the at least one gate and the at least one tube, with the hydroelectric generator generating electricity.

2. The method of claim 1, further comprising providing at least one sprinkler, wherein providing the at least one hollow buoyant member includes providing first and second hollow buoyant members adjacent one another, with the at least one sprinkler being between the first and second hollow buoyant members, and with the at least one sprinkler being adapted to downwardly spray a portion of rainwater collected and stored in the at least one reservoir.

3. The method of claim 1, further comprising providing at least one oblique plate on the at least one reservoir directing rainwater into the at least one reservoir and decreasing evaporation of water stored in the at least one reservoir.

4. The method of claim 1, further comprising providing at least one pump to transfer water to a collection reservoir through the at least one gate and the at least one tube when a small quantity of water is stored in the at least one reservoir.

5. The method of claim 2, further comprising providing at least one pump at the at least one reservoir to transfer water to a collection reservoir through the at least one gate and the at least one tube when a small quantity of water is stored in the at least one reservoir.

6. The method of claim 2, further comprising providing at least one oblique plate on the at least one reservoir directing rainwater into the at least one reservoir and decreasing evaporation of water stored in the at least one reservoir.

7. The method of claim 4, further comprising providing at least one sprinkler and at least one oblique plate on the at least one reservoir, wherein providing the at least one hollow buoyant member includes providing first and second hollow buoyant members adjacent one another, with the at least one sprinkler being between the first and second hollow buoyant members.

8. The method of claim 1, further comprising providing at least one pump to transfer water to a collection reservoir through the at least one gate and the at least one tube when a small quantity of water is stored in the at least one reservoir.

9. The method of claim 3, further comprising providing at least one pump to transfer water to a collection reservoir through the at least one gate and the at least one tube when a small quantity of water is stored in the at least one reservoir.

10. The method of claim 2, further comprising providing at least one oblique plate on the at least one reservoir directing rainwater into the at least one reservoir and decreasing evaporation of water stored in the at least one reservoir.

11. The method of claim 1, wherein the at least one hollow buoyant member floats in air and supports the at least one reservoir in the air.

12. The method of claim 1, wherein the at least one hollow buoyant member floats in water and supports the at least one reservoir on the water.

13. The method of claim 4, wherein the collection reservoir is a waterworks.

14. The method of claim 5, wherein the collection reservoir is a waterworks.

15. The method of claim 8, wherein the collection reservoir is a waterworks.

16. The method of claim 9, wherein the collection reservoir is a waterworks.

* * * * *